US012574368B2

(12) United States Patent
Verma et al.

(10) Patent No.: US 12,574,368 B2
(45) Date of Patent: ***Mar. 10, 2026

(54) PRE-AUTHENTICATION FOR INTERACTIVE VOICE RESPONSE SYSTEM

(71) Applicant: Bank of America Corporation, Charlotte, NC (US)

(72) Inventors: Sandeep Verma, Haryana (IN); Nandini Rathaur, Mumbai (IN); Pavan K. Chayanam, Alamo, CA (US); Srinivas Dundigalla, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/380,322

(22) Filed: Oct. 16, 2023

(65) Prior Publication Data

US 2025/0126112 A1      Apr. 17, 2025

(51) Int. Cl.
| | |
|---|---|
| *H04L 9/40* | (2022.01) |
| *H04M 3/51* | (2006.01) |

(52) U.S. Cl.
CPC ...... *H04L 63/0838* (2013.01); *H04L 63/0861* (2013.01); *H04M 3/5166* (2013.01)

(58) Field of Classification Search
None
See application file for complete search history.

(56) References Cited

U.S. PATENT DOCUMENTS

| | | | |
|---|---|---|---|
| 8,014,496 | B2 | 9/2011 | Schultz |
| 8,224,649 | B2 | 7/2012 | Chaudhari et al. |
| 8,428,238 | B2 | 4/2013 | Jain et al. |
| 9,412,381 | B2 * | 8/2016 | Bhaskaran .............. G06F 21/32 |
| 9,697,836 | B1 | 7/2017 | Lousky et al. |
| 9,858,573 | B2 | 1/2018 | Tew et al. |
| 11,711,361 | B2 | 7/2023 | Nair |

(Continued)

FOREIGN PATENT DOCUMENTS

| | | |
|---|---|---|
| KR | 20050009770 A | 1/2005 |

OTHER PUBLICATIONS

Jun. 11, 2025—U.S. Non-Final Office Action—U.S. Appl. No. 18/380,314.

*Primary Examiner* — William J. Goodchild
(74) *Attorney, Agent, or Firm* — Banner & Witcoff, Ltd.

(57) ABSTRACT

Arrangements for pre-authenticating users to interactive voice response (IVR) systems are provided. In some examples, a computing device may receive and store a valid telephone number associated with an enterprise organization IVR system and an enterprise organization application programming interface (API) access key. A request to initiate a communication session with the IVR system may be received and the request may include a telephone number. If the telephone number matches the valid telephone number, an API call to the enterprise organization may be made and a one-time passcode (OTP) may be received. The telephone number may be appended to include the OTP as a suffix and the communication session with the IVR system may be initiated. The IVR system may extract the OTP and validate the OTP. If the OTP is validated, the communication session may be initiated as a pre-authenticated call.

20 Claims, 15 Drawing Sheets

(56)       References Cited

U.S. PATENT DOCUMENTS

| 2007/0165799 | A1 | 7/2007 | Juncker |
| 2008/0282331 | A1 | 11/2008 | Teo |
| 2022/0067740 | A1 | 3/2022 | Patel et al. |
| 2024/0236084 | A1 | 7/2024 | Pothiawala et al. |

* cited by examiner

110

111

112

OTP Generation And Processing Computing Platform

Processor(s)

Memory(s)

Registration Module
112a

Mobile Application OTP Generation Module
112b

Operating System OTP Generation Module
112c

Call Connection Module
112d

Database
112e

113

Communication Interface(s)

PRE-AUTHENTICATION FOR INTERACTIVE VOICE RESPONSE SYSTEM

BACKGROUND

Aspects of the disclosure relate to electrical computers, systems, and devices for providing pre-authentication of users in an interactive voice response system.

Many enterprise organizations rely on interactive voice response systems to provide initial customer service interactions with users. However, authenticating users via conventional interactive voice response systems may be prone to unauthorized activity. For instance, often, interactive voice response systems will request known authentication data, such as a date of birth, to authenticate a user. If an unauthorized actor obtains this information, the unauthorized actor may access user accounts, and the like, and, in some examples, may modify login information in order to take over the user account. Accordingly, more secure systems for authenticating users via interactive voice response systems would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with authenticating users to interactive voice response systems.

In some examples, a user may be authenticated to a computing device, such as a mobile device. The computing device may receive one or more valid telephone numbers associated with an enterprise organization interactive voice response (IVR) system. An enterprise organization application programming interface (API) access key may also be received.

A request to initiate a communication session with the enterprise organization IVR system may be received by the computing device. In some examples, the request may include a telephone number. The computing device may confirm that the telephone number matches the one or more valid telephone numbers associated with the enterprise organization IVR system. If so, an API call to the enterprise organization may be made and a one-time passcode may be received from the enterprise organization. The telephone number may be appended to include the one-time passcode as a suffix and the communication session with the IVR system may be initiated. The IVR system may extract the one-time passcode from the telephone number and appended one-time passcode and may validate the one-time passcode. If not validated, the communication session may be initiated as a standard call in which authentication data of the user is requested during the call. If the one-time passcode is validated, the communication session may be initiated as a pre-authenticated call.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
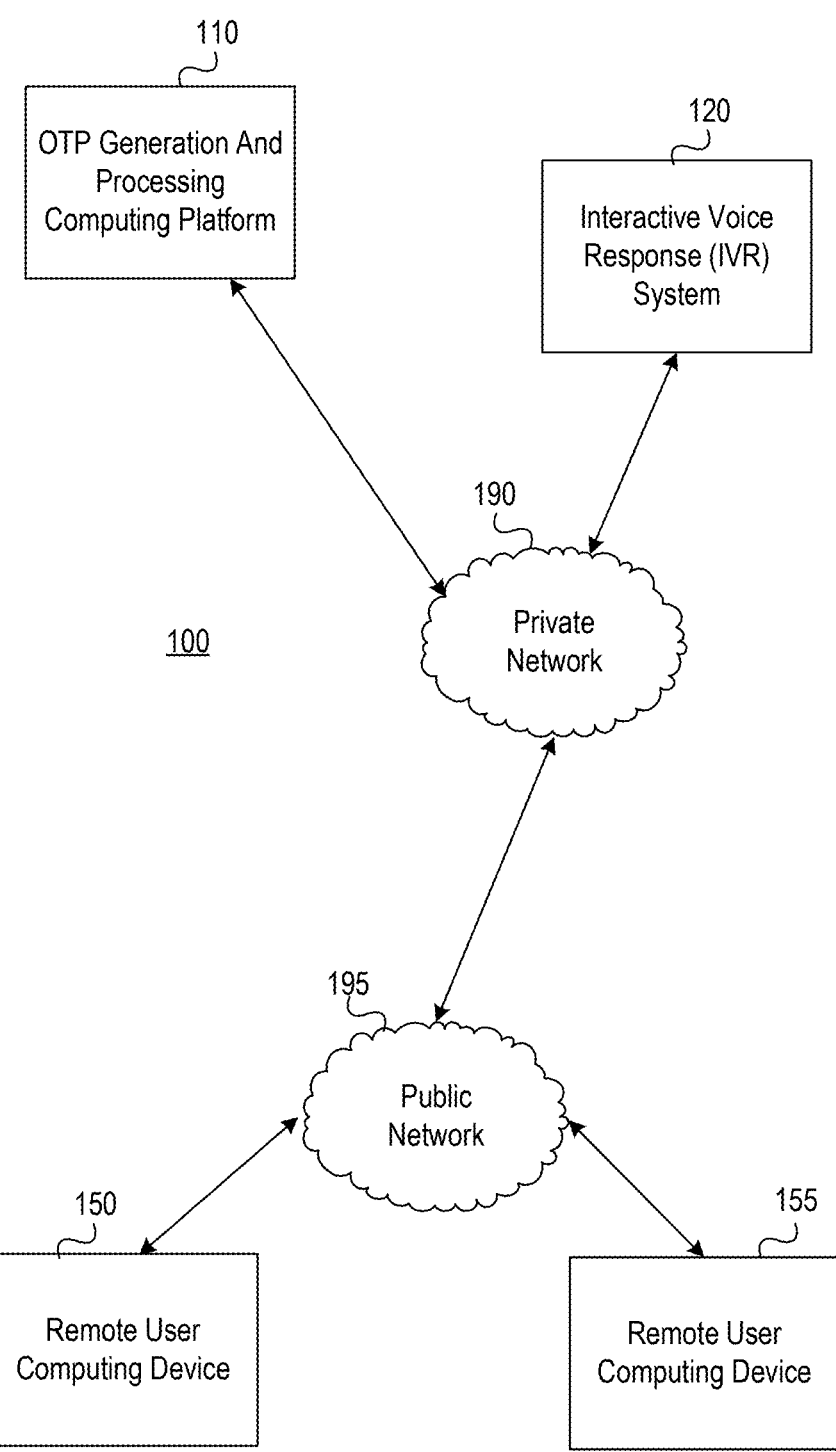
FIGS. 1A and 1B depict an illustrative computing environment for pre-authenticating users to an interactive voice response system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional methods of authentication at interactive voice response (IVR) systems may be susceptible to unauthorized activity. For instance, conventional IVR authentication arrangements may be susceptible to unauthorized users access user accounts, user data, or the like, by impersonating the user (e.g., providing authentic user data obtained by unauthorized means). In some examples, a conventional IVR system may request authentication data such as date of birth, last four digits of a card number, or the like, from the user during the call. Once the customer is authenticated, the user can access data, change account settings, and the like. Accordingly, if an unauthorized user has access to the user data, the unauthorized user may be able to take over the user account.

Accordingly, in order to confirm that the IVR system is, in fact, connected to an authorized user, the arrangements described herein provide pre-authentication of a user prior to engaging, via the call, with the IVR system.

In some examples, a user may log in to a mobile application executing on a mobile device and may initiate a call to the interactive voice response system through the mobile application. A computing platform may intercept the call, determine that the user is logged into the mobile application (e.g., is authenticated to the mobile application) and may generate a one-time passcode that may be appended as a suffix to the telephone number used to initiate the call. The interactive voice response system may validate the one-time passcode and the user may be pre-authenticated.

In some examples, a user may log in to a mobile device (e.g., via personal identification number, biometrics such as fingerprint or facial identification, or the like) and may initiate a call to the interactive voice response system using a preregistered telephone number. The operating system of the mobile device may initiate an application programming interface (API) call to the enterprise organization associated with the interactive voice response system to obtain a one-time passcode. The one-time passcode may be appended to the telephone number used to initiate the call. The interactive voice response system may validate the one-time passcode and the user may be pre-authenticated.

These and various other arrangements will be discussed more fully below.

Figure 1B:
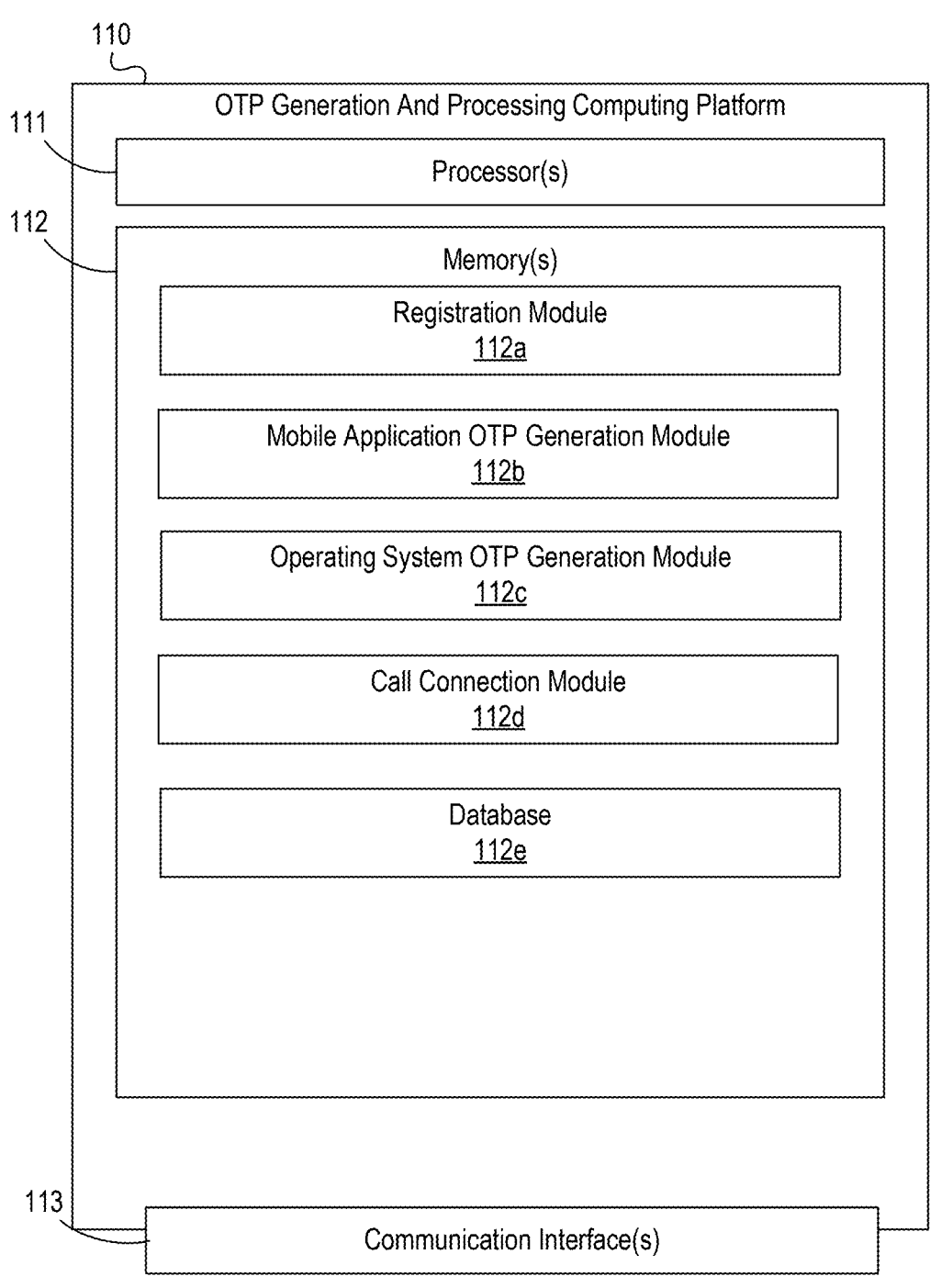

Aspects described herein may be implemented using one or more computing devices operating in a computing environment. For instance, FIGS. 1A-1B depict an illustrative computing environment for implementing pre-authentication for interactive voice response (IVR) system functions in accordance with one or more aspects described herein. Referring to FIG. 1A, computing environment 100 may include one or more computing devices and/or other computing systems. For example, computing environment 100 may include one-time passcode (OTP) generation and processing computing platform 110, interactive voice response (IVR) system 120, remote user computing device 150, and/or remote user computing device 155. Although one interactive voice response system 120 and two remote user computing devices 150, 155, are shown, any number of systems or devices may be used without departing from the invention. Further, while OTP generation and processing computing platform 110 is shown as a separate device from IVR system 120, and from remote user computing device 150, 155, in some examples, OTP generation and processing computing platform 110 may be part of a same device or integrated with IVR system 120 and/or remote user computing device 150, remote user computing device 155 (e.g., associated with an application executing on the remote user computing device).

OTP generation and processing computing platform 110 may be configured to perform intelligent, dynamic, and efficient pre-authentication for IVR systems. For instance, OTP generation and processing computing platform 110 may receive a request to initiate a communication session between a mobile device of a user and an enterprise organization (e.g., an interactive voice response system of the enterprise organization, such as IVR system 120). In some examples, the request may be received via a mobile application associated with the enterprise organization and executing on the mobile device of the user. In other examples, the request may be received via an operating system of the mobile device of the user.

In examples in which the request is received via the application executing on the mobile device of the user, the OTP generation and processing computing platform 110 may identify a telephone number associated with the IVR system 120. The OTP generation and processing computing platform 110 may generate a one-time passcode (OTP). The OTP may be unique to the user and the requested communication session. The OTP generation and processing computing platform 110 may append the OTP as a suffix to the identified telephone number. In some arrangements, the OTP generation and processing computing platform 110 may initiate (or enable connection of) a telephone call between the mobile device of the user and the IVR system 120 by pushing the telephone number and appended OTP to the IVR system 120. In some examples, initiating the telephone call may cause the IVR system 120 to extract the OTP and validate the OTP. If the OTP is validated, the user may be considered pre-authenticated to the call and the OTP generation and processing computing platform 110 may cause the telephone call to be connected as pre-authenticated and, accordingly, the IVR system 120 may commence the call without the user being further authenticated (e.g., no additional authentication may be required and, in some examples, the IVR system 120 may bypass the decision tree requiring authentication and may commence the call at a decision tree associated with substantive requests for information such as "what are you looking for today?" or other requests). If the OTP is not validated, the OTP generation and processing computing platform 110 may cause the telephone call to be initiated as a standard call and, accordingly, the IVR system 120 may commence the call with requests for authentication information from the user.

In examples in which the request for communication session is initiated via the operating system of the mobile device, OTP generation and processing computing platform 110 may receive a request to initiate a communication session with an enterprise organization. The request may be received via an operating system of a mobile device of a user. In some examples, the request may include a telephone number associated with an interactive voice response system of the enterprise organization. In some examples, OTP generation and processing computing platform 110 may confirm that the received telephone number is a valid telephone number of the interactive voice response system of the enterprise organization (e.g., that the telephone number a pre-stored or pre-registered number associated with the IVR system 120 of the enterprise organization).

Responsive to confirming that the telephone number is valid, in some examples, OTP generation and processing computing platform 110 may determine that a valid enterprise organization application programming interface (API) access key is available (e.g., that an enterprise-specific API access key is stored). Responsive to determining that the enterprise organization API access key is available, OTP generation and processing computing platform 110 may initiate a call to an enterprise organization API. In some examples, the call to the enterprise organization API may include the enterprise organization access key and authentication data of the user.

The enterprise organization may validate the enterprise organization API access key and the authentication data of the user and, in response, may generate a one-time passcode (OTP). The OTP may be unique to the user and the initiated communication session. The OTP generation and processing computing platform 110 may receive the OTP via the enterprise organization API call and may append the OTP to the telephone number as a suffix.

In some arrangements, the OTP generation and processing computing platform 110 may initiate (or enable connection of) the communication session between the mobile device of the user and the IVR system 120 of the enterprise organization using the telephone number and appended OTP as a suffix. In some examples, initiating the communication session may including initiating a telephone call between the mobile device of the user and the IVR system of the enterprise organization by pushing or sending the OTP as a suffix to the telephone number used to initiate the call. Initiating the communication session may further including requesting validation of the OTP by the IVR system 120. If the OTP is validated, the user may be considered pre-authenticated to the call and the OTP generation and processing computing platform 110 may cause the telephone call to be connected as pre-authenticated and, accordingly, the IVR system 120 may commence the call without the user being further authenticated (e.g., no additional authentication may be required and, in some examples, the IVR system may bypass the decision tree requiring authentication and may commence the call at a decision tree associated with substantive requests for information such as "what are you looking for today?" or other requests). If the OTP is not validated, the OTP generation and processing computing platform 110 may cause the telephone call to be initiated as a standard call and, accordingly, the IVR system 120 may commence the call with requests for authentication information from the user.

Interactive voice response system 120 may be or include one or more computing systems, devices, or the like (e.g., servers, server blade, and the like) including one or more computer components (e.g., processor, memory and the like), that may host or execute one or more interactive voice response applications. For instance, interactive voice response system 120 may host or execute applications for receiving telephone communications from users, using one or more decision tress to generate requests for information from users and provide response data to users, based on user input received, generate one or more additional prompts or requests for information, and the like. In some examples, interactive voice response system 120 may be connected to or in communication with one or more internal entity computing systems or devices that may store customer data, customer account data, and the like in order to retrieve data associated with customers during communication sessions with an authenticated customer.

Remote user computing device 150 and/or remote user computing device 155 may be or include one or more user computing devices (e.g., smart phones, wearable devices, laptops, desktops, tablets, or the like) that may be used (e.g., by a customer of the enterprise organization, or the like) to request a communications session with the enterprise organization (e.g., with the IVR system 120 of the enterprise organization), execute a mobile or web-based application of the enterprise organization, communicate with the IVR system 120 and/or agents of the enterprise organization, and the like.

As mentioned above, computing environment 100 also may include one or more networks, which may interconnect one or more of OTP generation and processing computing platform 110, interactive voice response system 120, remote user computing device 150 and/or remote user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, OTP generation and processing computing platform 110 and/or interactive voice response system 120, may be associated with an enterprise organization (e.g., a financial institution), and private network 190 may be associated with and/or operated by the organization, and may include one or more networks (e.g., LANs, WANs, virtual private networks (VPNs), or the like) that interconnect OTP generation and processing computing platform 110 and/or interactive voice response system 120 and one or more other computing devices and/or computer systems that are used by, operated by, and/or otherwise associated with the organization. Public network 195 may connect private network 190 and/or one or more computing devices connected thereto (e.g., OTP generation and processing computing platform 110, interactive voice response system 120) with one or more networks and/or computing devices that are not associated with the organization. For example, remote user computing device 150 and/or remote user computing device 155 might not be associated with an organization that operates private network 190 (e.g., because remote user computing device 150 and/or remote user computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 150 and/or remote user computing device 155 to private network 190 and/or one or more computing devices connected thereto (e.g., OTP generation and processing computing platform 110, interactive voice response system 120, or the like).

Referring to FIG. 1B, OTP generation and processing computing platform 110 may include one or more processors 111, memory 112, and communication interface 113. A data bus may interconnect processor(s) 111, memory 112, and communication interface 113. Communication interface 113 may be a network interface configured to support communication between OTP generation and processing computing platform 110 and one or more networks (e.g., private network 190, or the like). Memory 112 may include one or more program modules having instructions that when executed by processor(s) 111 cause OTP generation and processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of OTP generation and processing computing platform 110 and/or by different computing devices that may form and/or otherwise make up OTP generation and processing computing platform 110.

For example, memory 112 may have, store and/or include registration module 112a. Registration module 112a may have or includes instructions that may cause or enable OTP generation and processing computing platform 110 to receive requests from a plurality of users to register for OTP pre-authentication. In some examples, the request to register may include user identifying information (e.g., name, contact information, mobile device number, account number, or the like), device identifying information (e.g., unique identifier for one or more devices being registered, or the like), and user preference data, and the like. In some examples, the registration module 112a may receive the requests for registration, and associated registration data, through an enterprise organization application executing on a mobile device of a respective user, such as remote user computing device 150, remote user computing device 155, or the like. In some examples, the registration module 112a may send, to the remote user computing device 150, 155, valid telephone numbers associated with an interactive voice response system of an enterprise organization, as well as an application programming interface (API) access key to enable access to the enterprise organization API.

OTP generation and processing computing platform 110 may further have, store, and/or include mobile application OTP generation module 112b. Mobile application OTP generation module 112b may store instructions and/or data that may cause or enable the OTP generation and processing computing platform 110 to receive a request, from a mobile application executing on a user device, such as remote user computing device 150, remote user computing device 155, or the like, to initiate a communication session between the user device and an IVR system 120 of the enterprise organization. In some examples, the mobile application OTP generation module 112b may monitor and detect a request for the communication session made via the mobile application. The mobile application OTP generation module 112b may verify that the user is logged in to the mobile application and may generate an OTP that may be appended to a phone number used to initiate the communication session as a suffix. The call may be pushed to the IVR system 120 and the IVR system 120 may extract the OTP from the data received to initiate the communication session and may validate the OTP in order to pre-authenticate the user. If the OTP is validated, the call may be connected or enabled (e.g., by call connection module 112d) and the user may be pre-authenticated such that the IVR system 120 might not request authenticating data from the user. If the OTP is not validated, the call may be connected as a standard call and the IVR system 120 may request authentication data from the user.

OTP generation and processing computing platform 110 may further have, store and/or include operating system OTP generation module 112c. Operating system OTP generation module 112c may store instructions and/or data that may cause or enable the OTP generation and processing computing platform 110 to receive or detect a request, from an operating system of a user device, such as remote user computing device 150, remote user computing device 155, or the like, to initiate a communication session between the user device and the IVR system 120. Operating system OTP generation module 112c may initiate an application programming interface call to the enterprise organization, using an enterprise organization API access key, to obtain an OTP. The operating system OTP generation module 112c may append the OTP to a phone number used to initiate the communication session between the user device and the IVR system 120. The IVR system may extract the OTP and validate the OTP to pre-authenticate the user. If the OTP is validated, the call may be connected or enabled (e.g., by call connection module 112d) and the user may be pre-authenticated such that the IVR system 120 might not request authenticating data from the user. If the OTP is not validated, the call may be connected as a standard call and the IVR system 120 may request authentication data from the user.

OTP generation and processing computing platform 110 may further have, store and/or include call connection module 112d. Call connection module 112d may store instructions and/or data that may cause or enable the OTP generation and processing computing platform 110 to generate or receive an OTP and initiate or enable a communication session between the user device, such as remote user computing device 150, remote user computing device 155, or the like, and the IVR system 120. The call connection module 112d may push the phone number and appended OTP to the IVR system 120 for validation and the IVR system 120 may then accept the call as a pre-authenticated call or standard call based on whether the OTP is validated.

OTP generation and processing computing platform 110 may further have, store and/or include database 112e. Database 112e may store data associated with users, user devices, OTPs, communication session history, and/or other data used by OTP generation and processing computing platform 110.

FIGS. 2A-2D depict one example illustrative event sequence for implementing pre-authentication for interactive voice response systems in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
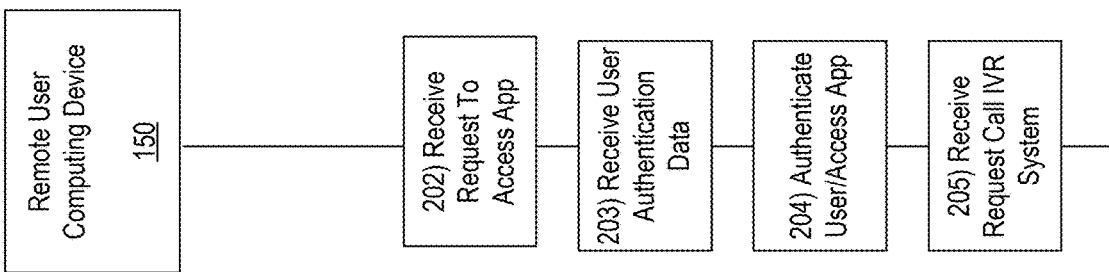
FIGS. 2A-2D depict an illustrative event sequence for pre-authenticating users to an interactive voice response system in accordance with one or more aspects described herein.
Figure 2A:
Figure 2A:

With reference to FIG. 2A, at step 201, one or more of OTP generation and processing computing platform 110 and/or interactive voice response system 120 may receive registration data. The registration data may be received from one or more user devices, such as remote user computing device 150. The registration data may include user identifying data, device identifying data, and the like. In some examples, the registration data may be received via an enterprise organization application executing on remote user computing device (e.g., a mobile banking app, or the like).

At step 202, remote user computing device 150 may receive a request to access an application executing on the remote user computing device 150. For instance, remote user computing device 150 may receive selection of the enterprise organization application indicating a request to open the application.

At step 203, in response to the request to access the application, user authentication data may be received by the remote user computing device 150. For instance, biometric data such as fingerprint, face identification, or the like, may be captured by the remote user computing device 150 to authenticate the user to the application. Additionally or alternatively, a username and password, personal identification number, or the like, may be used to authenticate the user in order to access the requested application.

At step 204, in response to authenticating the user based on the received authentication data, remote user computing device 150 may provide user access to the application (e.g., the application may open to a home screen or the like).

At step 205, remote user computing device 150 may receive a request to initiate a communication session with the enterprise organization IVR system 120. For instance, remote user computing device 150 may display a user interface in the application that includes an icon or other selectable user interface element to initiate a communication session with a call center, customer service center, or the like, associated with the IVR system 120.

Figure 2B:
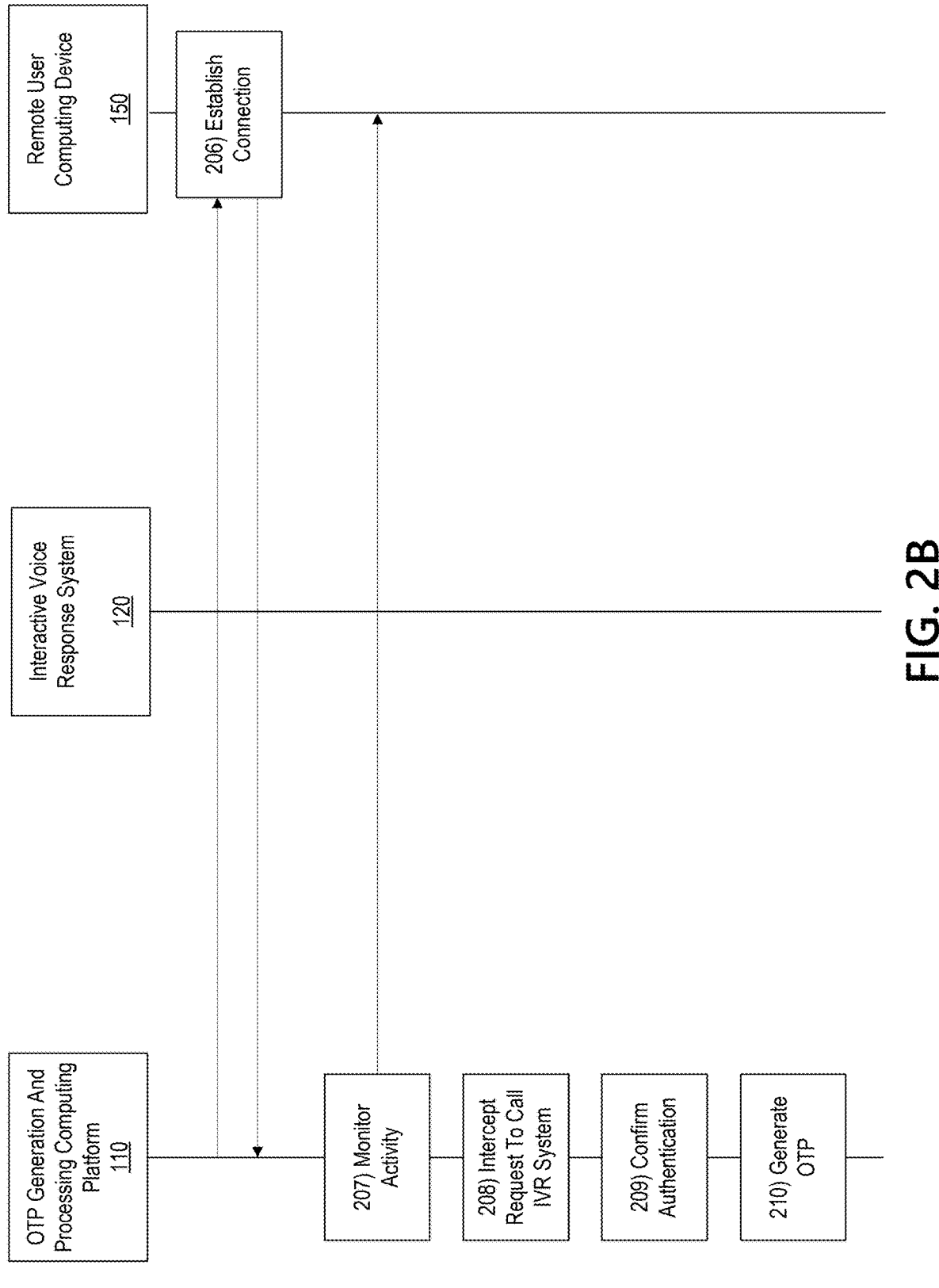

With reference to FIG. 2B, at step 206, remote user computing device 150 may establish a connection with OTP generation and processing computing platform 110. For instance, a first wireless connection may be established between remote user computing device 150 and OTP generation and processing computing platform 110. Upon establishing the first wireless connection, a communication session may be initiated between remote user computing device 150 and OTP generation and processing computing platform 110. In some examples, remote user computing device 150 may determine that a connection already exists. If so, an additional connection might not be established.

At step 207, OTP generation and processing computing platform 110 may monitor the application executing on the remote user computing device 150 to determine whether a request to initiate a communication session with the IVR system 120 has been received via the application.

At step 208, OTP generation and processing computing platform 110 may intercept the request to initiate the communication session between the remote user computing device 150 and the IVR system 120. For instance, OTP generation and processing computing platform 110 may detect the request to initiate the communication session and may initiate one or more OTP generation functions in response.

At step 209, OTP generation and processing computing platform 110 may confirm authentication of the user. For instance, OTP generation and processing computing platform 110 may confirm that the user is currently logged in to the application through which the request to initiate the communication session was received. If not, the process may end and the call to the IVR system 120 may be connected via standard processes as a standard call without pre-authentication.

If the user is authenticated to the application, at step 210, OTP generation and processing computing platform 110 may generate an OTP. The OTP may be specific to the user and the communication session being initiated. In some examples, the OTP may be valid for a predetermined time period and may be automatically deleted if not used to validate the user with the IVR system 120 within the predetermined time period.

Figure 2C:
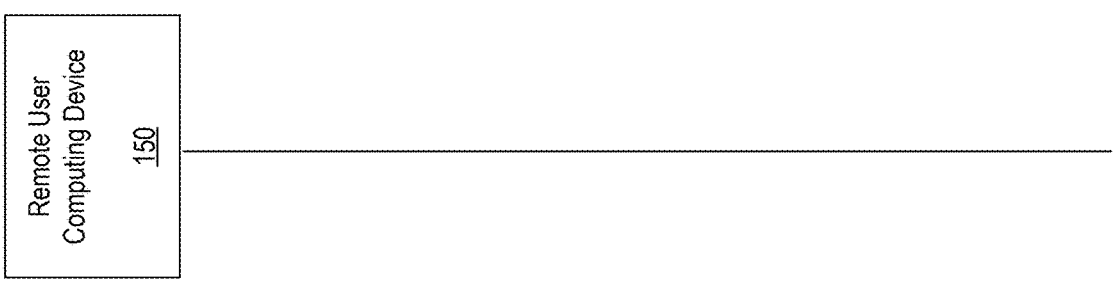
Figure 2C:
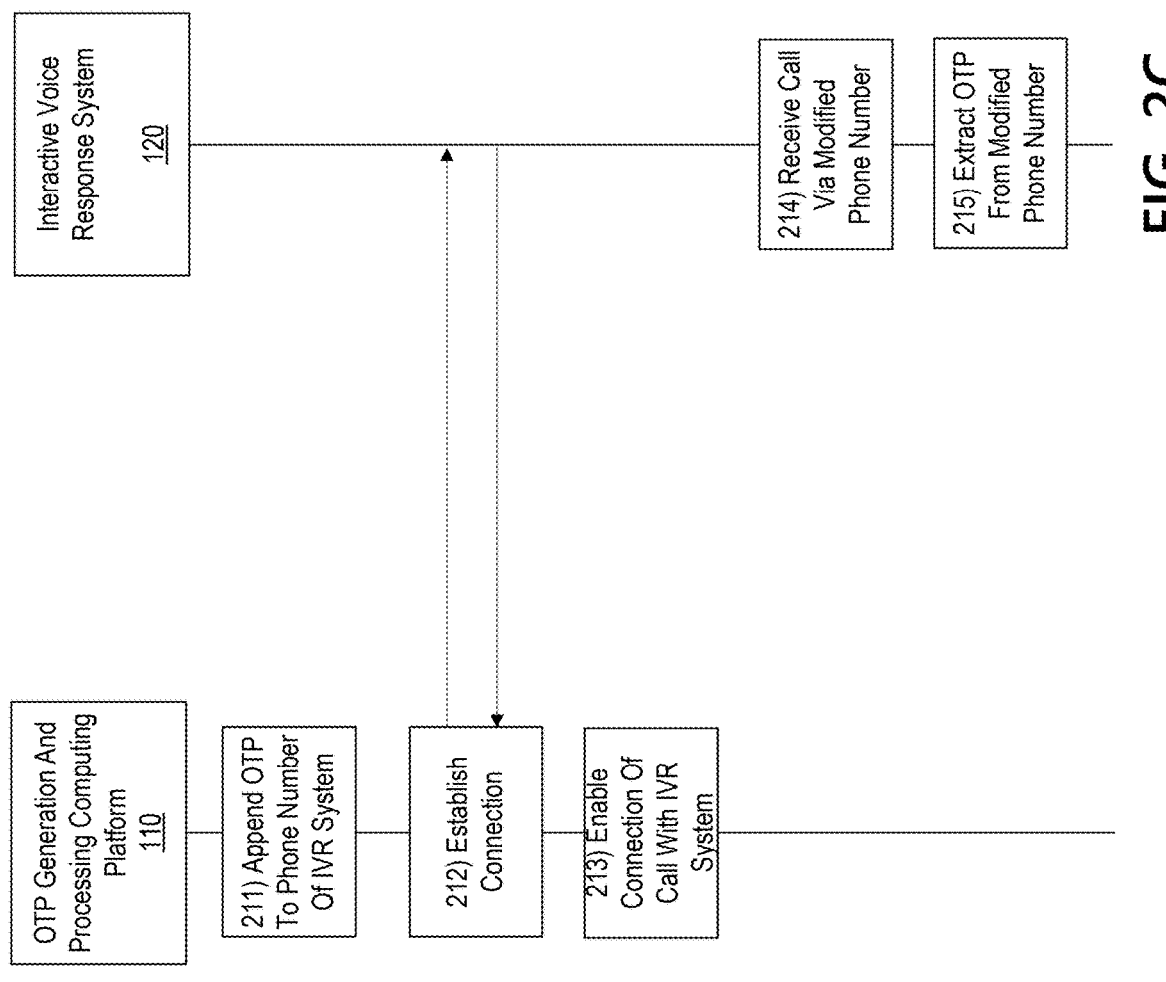

With reference to FIG. 2C, at step 211, the OTP generation and processing computing platform 110 may append the generated OTP to a phone number used to initiate the communication session as a suffix. For instance, if a user initiated the communication session by selecting an option to call for assistance, that call may include a phone number used to connect the user to the IVR system 120 (e.g., 1-800-XXX-XXXX). The OTP generation and processing computing platform 110 may intercept that call and append the generated OTP to the phone number as a suffix. Accordingly, if the generated OTP is YYYYYY, the phone number may then become 1-800-XXX-XXXX, YYYYYY.

At step 212, the OTP generation and processing computing platform 110 may establish a connection with IVR system 120. For instance, a second wireless connection may be established between OTP generation and processing computing platform 110 and the IVR system 120. Upon establishing the second wireless connection, a communication session may be initiated between OTP generation and processing computing platform 110 and the IVR system 120. In some examples, OTP generation and processing computing platform 110 may determine that a connection already exists. If so, an additional connection might not be established.

At step 213, the OTP generation and processing computing platform 110 may enable a connection between the remote user computing device 150 and the IVR system 120. For instance, the OTP generation and processing computing platform 110 may push the intercepted request for communication session to the IVR system using the phone number and OTP suffix generated at step 211. In some examples, the OTP generation and processing computing platform 110 may also push the generated OTP to the IVR system 120 to enable the IVR system 120 to validate the OTP appended to the phone number. Additionally or alternatively, the IVR system 120 may transmit the extracted OTP (e.g., as discussed below) to the OTP generation and processing computing platform 110 for validation.

At step 214, the IVR system 120 may receive the request for communication session via the phone number and appended OTP (e.g., the modified phone number).

At step 215, the IVR system 120 may extract the OTP from the modified phone number.

Figure 2D:
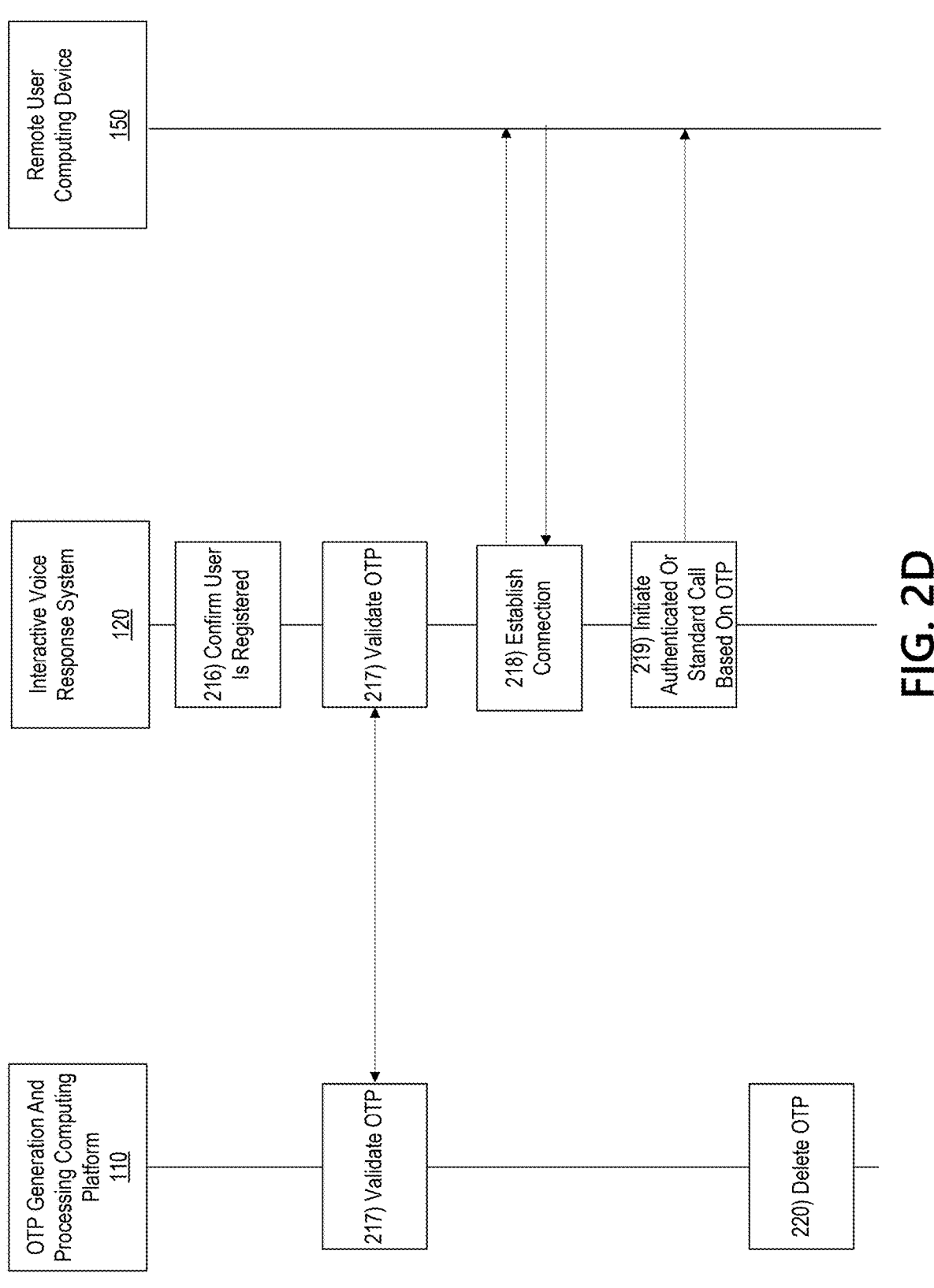

With reference to FIG. 2D, at step 216, the IVR system 120 may confirm that a user requesting the communication session is a registered user (e.g., that user registration information has been received from the user, that the device is identified, or the like).

At step 217, based on determining that the user is a registered user, IVR system 120 may validate the extracted OTP. For instance, the IVR system 120 may compare the extracted OTP to an OTP received from the OTP generation and processing computing platform 110 to determine whether the user is authenticated and the communication session should be a pre-authenticated communication session or whether the user is not authenticated (e.g., OTP not validated) and the call should be a standard call. Additionally or alternatively, the IVR system 120 may transmit or send the extracted OTP to the OTP generation and processing computing platform 110 for validation (e.g., the OTP generation and processing computing platform 110 may confirm whether the OTP is validated or not and transmit a notification to the IVR system that the user is authenticated based on the OTP (e.g., pre-authenticated call) or the user is not authenticated based on the OTP (e.g., standard call)).

The IVR system 120 may then initiate the call or communication session with the remote user computing device 150. For instance, at step 218, IVR system 120 may establish a connection with remote user computing device 150. For instance, a third wireless connection may be established between IVR system 120 and remote user computing device 150. Upon establishing the third wireless connection, a communication session may be initiated between IVR system 120 and remote user computing device 150.

At step 219, based on the outcome of the validation of the OTP (e.g., validated or not validated) the IVR system may initiate the communication session with the remote user computing device 150 as a pre-authenticated call (e.g., if validated) or a standard call (e.g., if not validated). Accordingly, the IVR system 120 may initiate the call with the user already being authenticated (e.g., decision trees related to authentication being bypassed) and might not request additional authentication data from the user (e.g., may begin the call with substantive questions). Alternatively, the IVR system 120 may initiate the call as a standard call (e.g., user not pre-authenticated) and may request authentication data from the user.

At step 220, the OTP generation and processing computing platform 110 may delete the OTP generated at step 210. For instance, after pushing the call to the IVR system 120, or after a predetermined time, the OTP generation and processing computing platform 110 may delete the generated OTP. Accordingly, a new OTP specific to the user and requested communication session may be generated when the user requests a subsequent communication session.

FIGS. 3A-3F depict another example illustrative event sequence for implementing pre-authentication for interactive voice response systems in accordance with one or more aspects described herein. The events shown in the illustrative event sequence are merely one example sequence and additional events may be added, or events may be omitted, without departing from the invention. Further, one or more processes discussed with respect to FIGS. 3A-3F may be performed in real-time or near real-time.

Figure 3A:
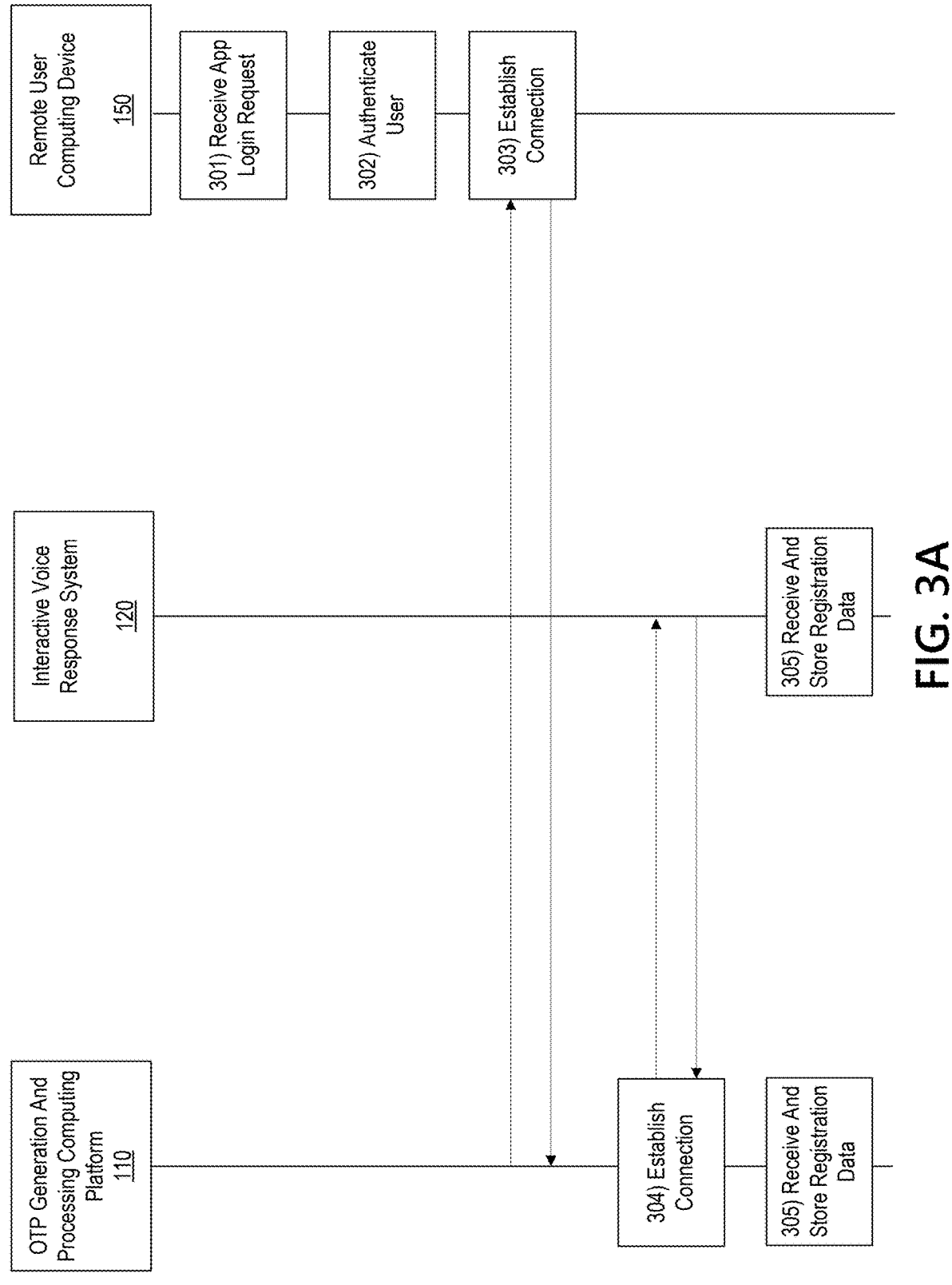
FIGS. 3A-3F depict an illustrative event sequence for pre-authenticating users to an interactive voice response system in accordance with one or more aspects described herein.

With reference to FIG. 3A, at step 301, remote user computing device 150 may receive a request to access an application downloaded to the remote user computing device 150. For instance, a user may select an application, such as a mobile banking application or other application associated with an enterprise organization, in order to open and/or access the application. In some examples, the user may select the application via a touch screen display on the remote user computing device 150, or other user input device.

At step 302, the remote user computing device 150 may authenticate the user in response to the request to access the application. For instance, the remote user computing device may capture biometric data (e.g., fingerprint, facial image, or the like), username and password, personal identification number, or the like) and may compare the data to pre-stored authentication data to determine whether the user is authenticated and may access the application. If the user is not authenticated, the process may end. If the user is authenticated, the user may be granted access to the application (e.g., the application may open to a home screen).

At step 303, remote user computing device 150 may establish a connection with OTP generation and processing computing platform 110. For instance, a first wireless connection may be established between remote user computing device 150 and OTP generation and processing computing platform 110. Upon establishing the first wireless connection, a communication session may be initiated between remote user computing device 150 and OTP generation and processing computing platform 110. In some examples, remote user computing device 150 may determine that a connection already exists. If so, an additional connection might not be established.

At step 304, the OTP generation and processing computing platform 110 may establish a connection with IVR system 120. For instance, a second wireless connection may be established between OTP generation and processing computing platform 110 and IVR system 120. Upon establishing the second wireless connection, a communication session may be initiated between OTP generation and processing computing platform 110 and IVR system 120. In some examples, OTP generation and processing computing platform 110 may determine that a connection already exists. If so, an additional connection might not be established.

At step 305, OTP generation and processing computing platform 110 and IVR system 120 may receive and store user registration data. For instance, remote user computing device 150 may receive, via the application executing on the remote user computing device 150 and accessed by the user, a request to register for OTP pre-authentication. The request to register may include user identifying information, device identifying information, account information, and the like.

Figure 3B:
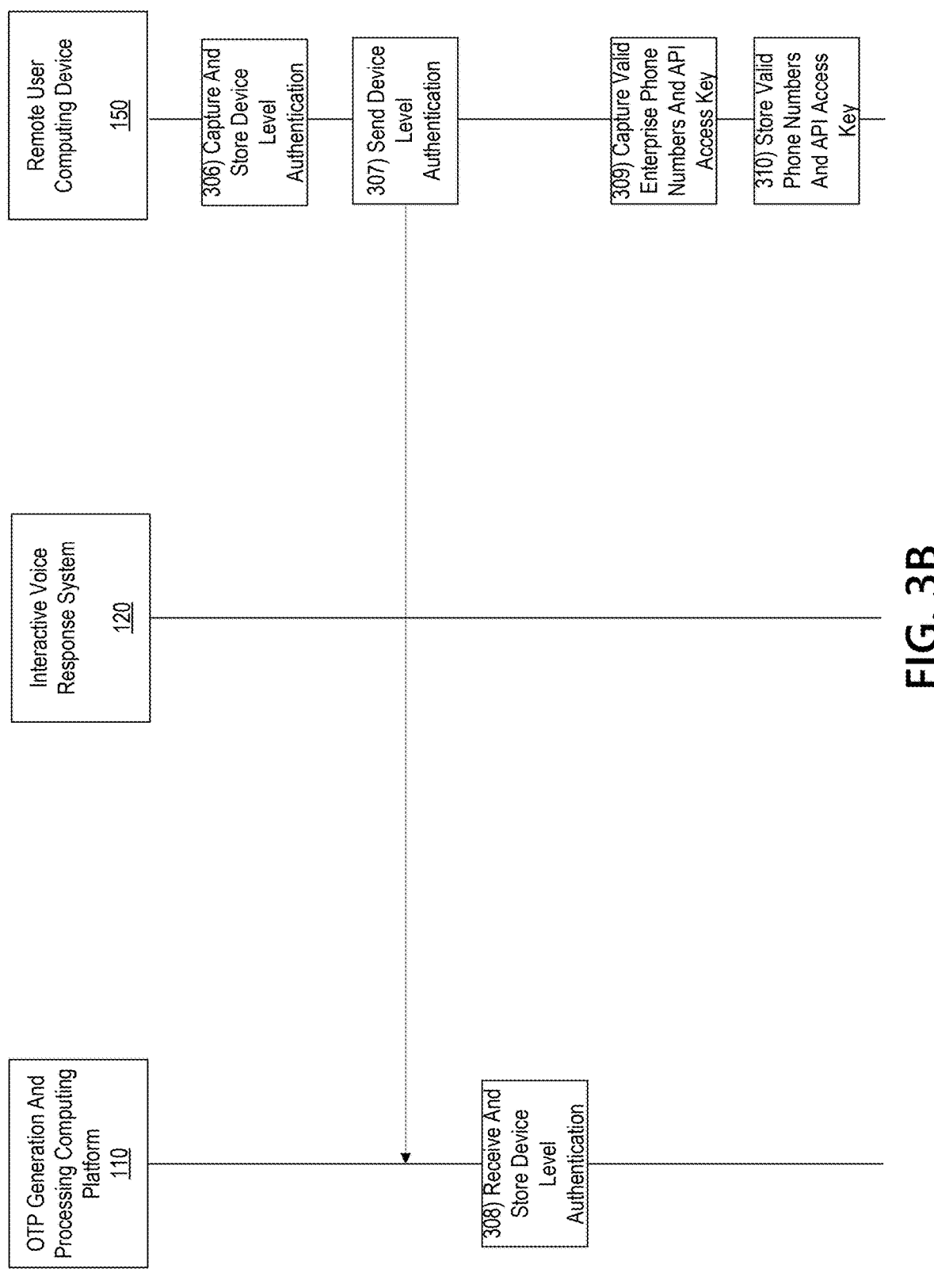

With reference to FIG. 3B, at step 306, remote user computing device 150 may capture and store device level authentication data. For instance, user biometric data, username and password, or the like, that is used to authenticate the user (e.g., to the remote user computing device 150, to the application, or the like) may be captured and a cryptographic hash of the authentication data may be generated. The hash may be stored by the remote user computing device 150 (e.g., via the application) and may be associated with a user profile.

At step 307, the remote user computing device 150 may transmit or send the hash of the device level authentication data to the OTP generation and processing computing platform 110. At step 308, OTP generation and processing computing platform 110 may store the hash of the user authentication data.

At step 309, remote user computing device 150 may capture valid enterprise organization phone numbers and a corresponding enterprise specific application programming interface (API) access key. For instance, the operating system of the remote user computing device 150 may retrieve valid telephone numbers to initiate a communication session with an IVR system 120 of an enterprise organization. In some examples, phone numbers for multiple different IVR systems associated with multiple different enterprise organizations may be retrieved. Further, an API access key for each enterprise organization may be received by the remote user computing device 150. In some examples, the API access key may include a portion that represents device level authentication data (e.g., a cryptographic hash, or the like), and a portion that represents a mobile device application authentication key.

At step 310, remote user computing device 150 may store the valid phone numbers and corresponding API access keys (e.g., in a device table). In some examples, remote user computing device 150 may store the valid phone numbers in encrypted form.

Figure 3C:
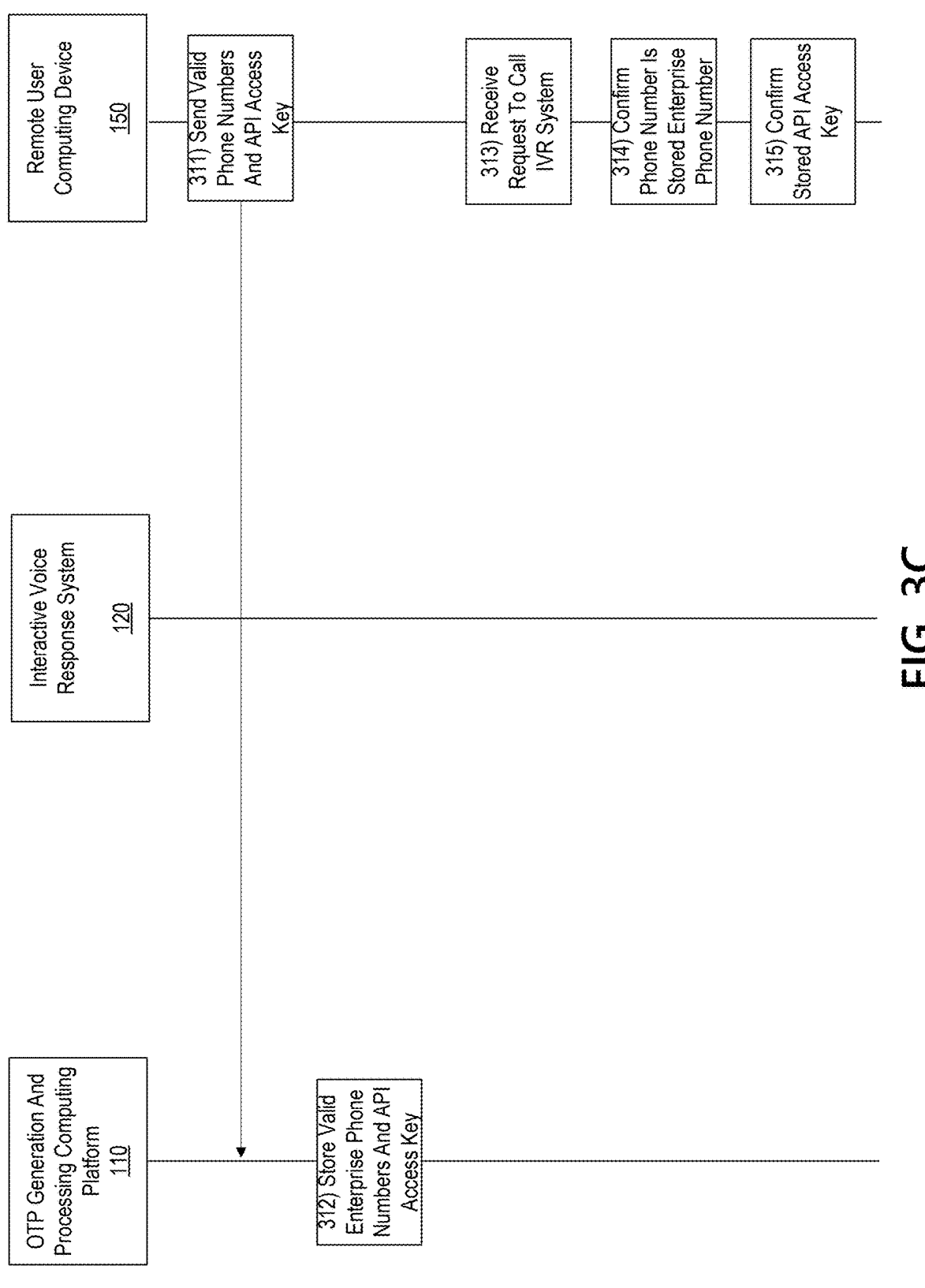

With reference to FIG. 3C, at step 311, remote user computing device 150 may transmit or send the valid phone numbers and API access keys to the OTP generation and processing computing platform 110. At step 312, OTP generation and processing computing platform 110 may store the valid phone numbers and API access keys.

At step 313, remote user computing device 150 may receive a request to initiate a communication session (e.g., call) the IVR system 120. In some examples, the request to call the IVR system 120 may be made using a telephone number input to the remote user computing device 150 and via the operating system of the remote user computing device 150 (e.g., not via the enterprise organization application executing on the remote user computing device).

At step 314, the remote user computing device 150 may confirm that the phone number input to request to initiate the communication session is a valid, stored enterprise organization phone number. For instance, the operating system of the remote user computing device 150 may confirm that the phone number used to initiate the communication session corresponds to a valid, stored phone number associated with an enterprise organization.

At step 315, the remote user computing device 150 may confirm that an enterprise organization API access key is stored by the remote user computing device 150. For instance, based on the telephone number used to initiate the communication session corresponding to a stored, valid enterprise organization phone number, the operating system of the remote user computing device 150 may confirm that an API access key corresponding to that enterprise organization is stored.

Figure 3D:
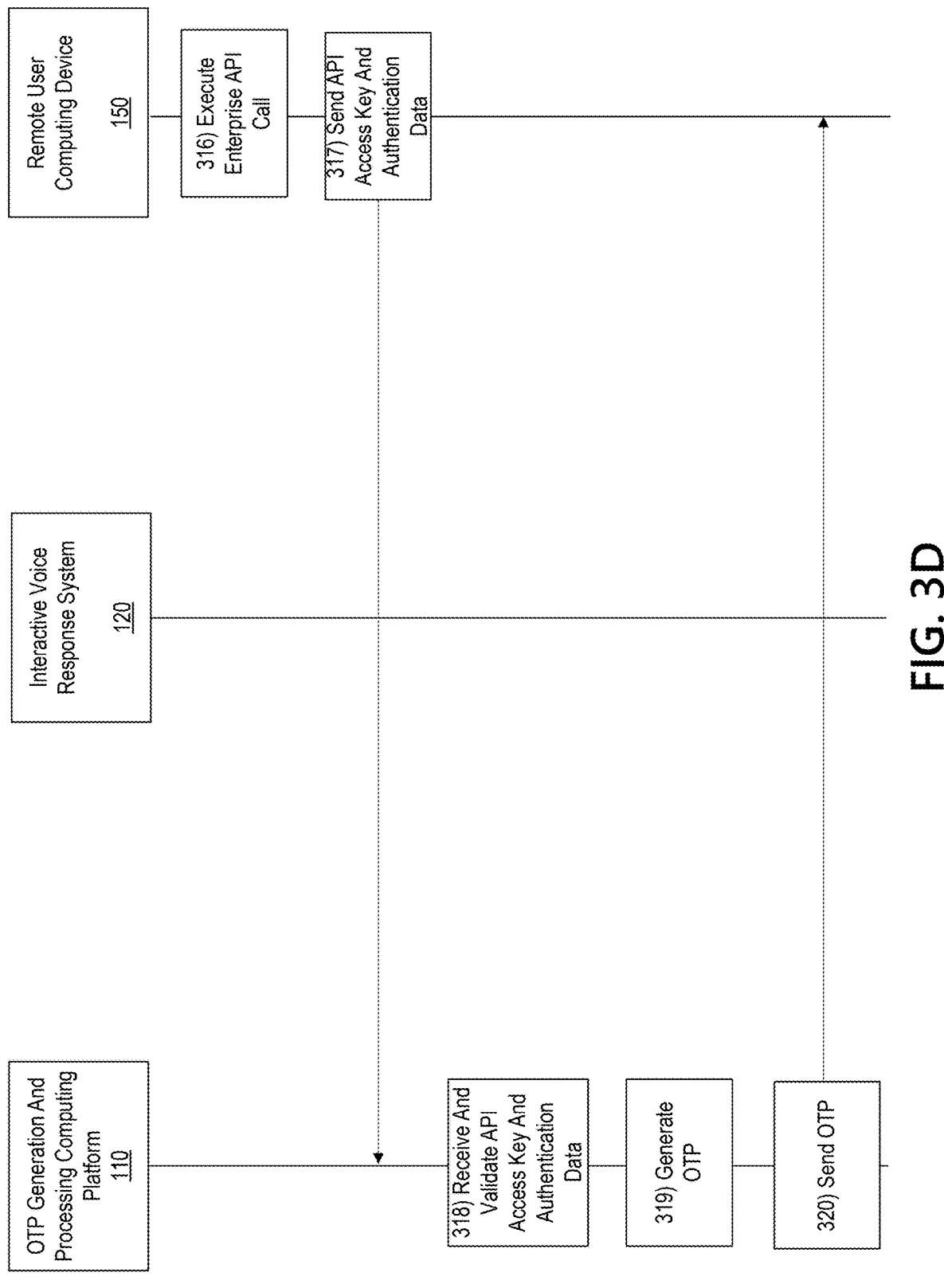

With reference to FIG. 3D, at step 316, based on determining that the phone number is a valid stored number and that an API access key for the enterprise organization is available, the remote user computing device 150 may execute and API call to the enterprise organization.

At step 317, the remote user computing device 150 may transmit or send the API access key and user authentication hash code to the OTP generation and processing computing platform 110 (e.g., via the API call).

At step 318, the OTP generation and processing computing platform 110 may receive and validate the API access key and authentication hash code. For instance, the OTP generation and processing computing platform 110 may confirm that the API access key is valid (e.g., based on comparison to pre-stored data) and that the authentication hash code matches a stored authentication hash code for the user. If not, the OTP generation and processing computing platform may cause the call to be initiated between the IVR system 120 and the remote user computing device 150 as a standard call without pre-authentication.

If the API access key and authentication hash code are validated, the OTP generation and processing computing platform 110 may generate an OTP at step 319. The OTP may be unique to the user and the requested communication session. In some examples, the OTP may be time limited and may expire after a predetermined time, after use, or the like (e.g., the OTP may be deleted).

At step 320, the OTP generation and processing computing platform 110 may transmit or send the OTP to the remote user computing device 150.

Figure 3E:
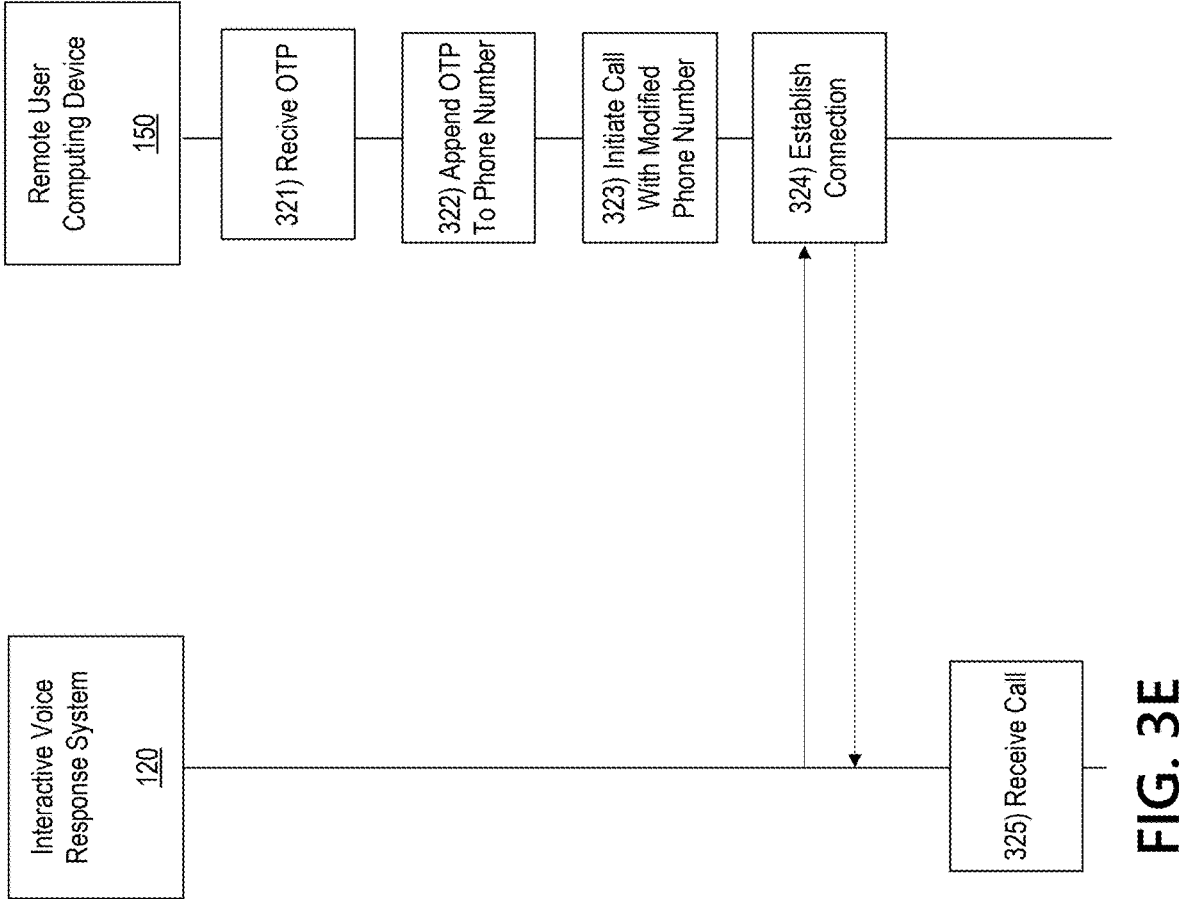
Figure 3E:

With reference to FIG. 3E, at step 321, remote user computing device 150 may receive the OTP generated at step 319.

At step 322, the remote user computing device 150 may append the OTP to the phone number used to initiate the request for communication session as a suffix. In some examples, appending the OTP as a suffix to the phone number may result in the final dialing number being a modified phone number or version of the stored enterprise organization phone number. For instance, if the enterprise organization phone number is 1-800-XXX-XXXX, then the final dialing number with the OTP appended as a suffix may be 1-800-XXX-XXXX, YYYYY, with YYYYY representing the OTP.

At step 323, the remote user computing device may initiate the call using the modified phone number. For instance, the remote user computing device 150 may initiate the call by dialing the modified phone number including the stored, valid phone number and appended OTP.

At step 324, remote user computing device 150 may establish a connection with IVR system 120. For instance, a third wireless connection may be established between remote user computing device 150 and IVR system 120. Upon establishing the third wireless connection, a communication session may be initiated between remote user computing device 150 and IVR system 120.

At step 325, the IVR system 120 may receive the call made by the remote user computing device 150 using the modified phone number.

Figure 3F:
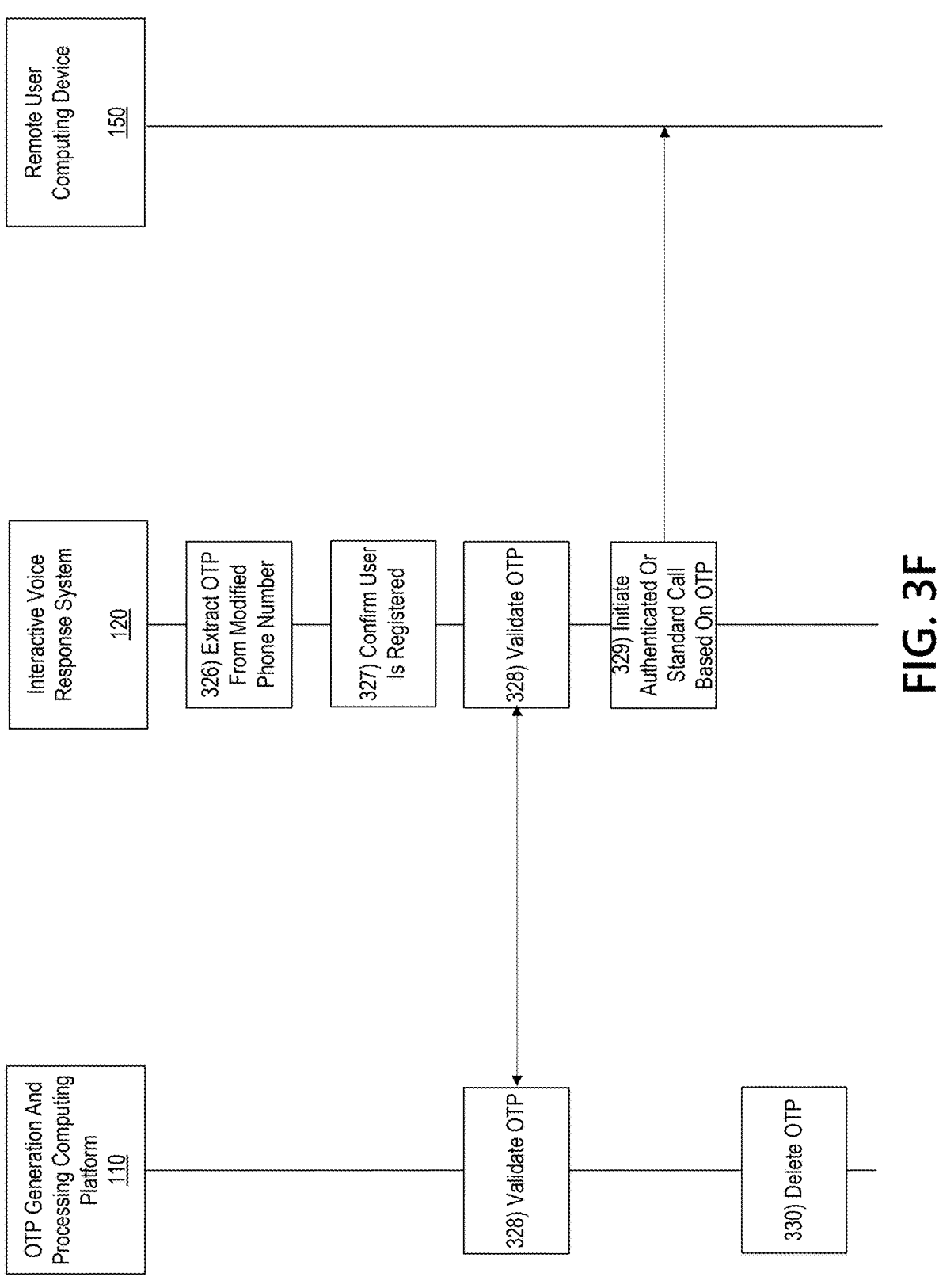

With reference to FIG. 3F, at step 326, IVR system 120 may extract the OTP from the modified phone number. At step 327, the IVR system 120 may confirm that the user initiating the call is a registered user (e.g., the call is received from a registered device, or the like).

At step 328, based on determining that the user is a registered user, IVR system 120 may validate the extracted OTP. For instance, the IVR system 120 may compare the extracted OTP to an OTP received from the OTP generation and processing computing platform 110 to determine whether the user is authenticated and the communication session should be a pre-authenticated communication session or whether the user is not authenticated (e.g., OTP not validated) and the call should be a standard call. Additionally or alternatively, the IVR system 120 may transmit or send the extracted OTP to the OTP generation and processing computing platform 110 for validation (e.g., the OTP generation and processing computing platform 110 may confirm whether the OTP is validated or not and transmit a notification to the IVR system that the user is authenticated based on the OTP (e.g., pre-authenticated call) or the user is not authenticated based on the OTP (e.g., standard call)).

The IVR system 120 may then initiate the call or communication session with the remote user computing device 150. For instance, at step 329, based on the outcome of the validation of the OTP (e.g., validated or not validated) the IVR system 120 may initiate the communication session with the remote user computing device 150 as a pre-authenticated call (e.g., if validated) or a standard call (e.g., if not validated). Accordingly, the IVR system 120 may initiate the call with the user being pre-authenticated (e.g., decision trees related to authentication being bypassed) and might not request additional authentication data from the user (e.g., may begin the call with substantive questions). Alternatively, the IVR system 120 may initiate the call as a standard call (e.g., user not pre-authenticated) and may request authentication data from the user.

At step 330, the OTP generation and processing computing platform 110 may delete the OTP generated at step 319. For instance, the call to the IVR system 120 is initiated or connected, or after a predetermined time, the OTP generation and processing computing platform 110 may delete the generated OTP. Accordingly, a new OTP specific to the user and requested communication session may be generated when the user requests a subsequent communication session.

Although one or more steps are shown and described as being performed by particular devices (e.g., OTP generation and processing computing platform 110, IVR system 120, remote user computing device 150), as discussed above, the OTP generation and processing computing platform 110 may be part of IVR system 120 or remote user computing device 150. Further, some steps may be performed by a device other than shown in FIG. 2A-2D or 3A-3F (e.g., steps shown as performed by the OTP generation and processing computing platform 110 may be performed by remote user computing device 150, or IVR system 120, as one example. In another example, processes performed by remote user computing device 150 in FIGS. 2A-2D or FIGS. 3A-3F may be performed by OTP generation and processing computing platform 110.). Various other arrangements may be used without departing from the invention.

Figure 4:
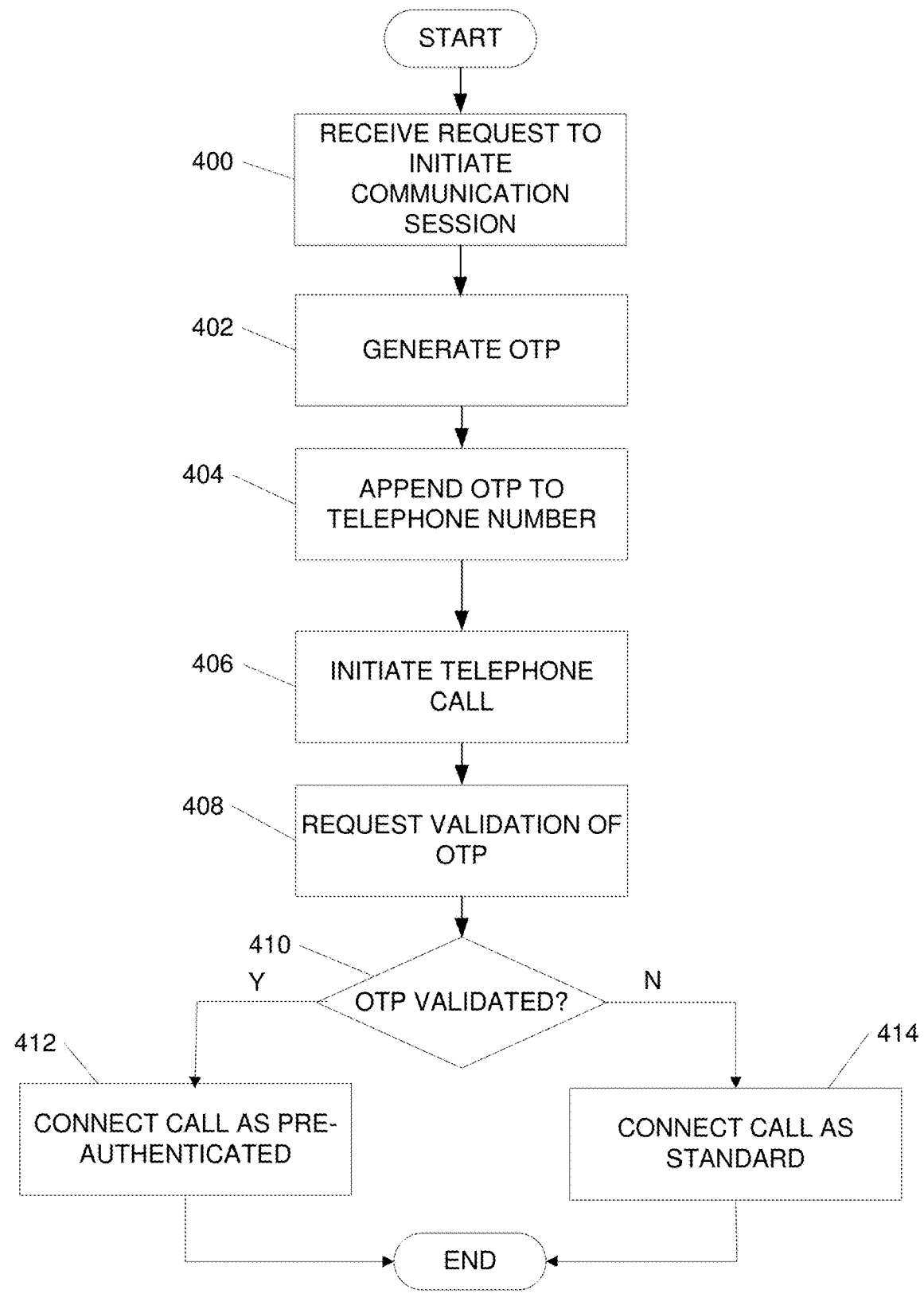
FIG. 4 illustrates an illustrative method for pre-authenticating users to an interactive voice response system according to one or more aspects described herein.

FIG. 4 is a flow chart illustrating one example method of implementing pre-authentication at interactive voice response systems in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a computing platform 110 may receive a request to initiate a communication session with an enterprise organization. The request may be received via a mobile application executing on a mobile device of a user. In some examples, the request to initiate the communication session may include a telephone number associated with an interactive voice response (IVR) system 120 of the enterprise organization.

At step 402, the computing platform 110 may generate, based on receiving the request via the mobile application, a one-time passcode. In some examples, the one-time passcode may be unique to the user and the requested communication session.

At step 404, the computing platform 110 may append the OTP to the telephone number of the IVR system 120 as a suffix. At step 406, the computing platform may initiate the communication session between the mobile device of the user (e.g., remote user computing device 150) and the IVR system 120 of the enterprise organization using the telephone number and OTP appended to the telephone number as a suffix. Accordingly, the computing platform may initiate the telephone call between the mobile device of the user and the interactive voice response system of the enterprise organization using the phone number and appended OTP.

At step 408, the computing platform 110 may request validation of the OTP from the interactive voice response system. For instance, initiating the telephone call may cause the telephone number and OTP appended to the telephone number as a suffix to be sent to the IVR system 120. The IVR system 120 may extract the OTP and validate the OTP (e.g., confirm whether the OTP received matches the OTP generated by the computing platform 110).

At step 410, a determination may be made as to whether the OTP was validated. If so, the computing platform 110 may cause the telephone call to be connected as a pre-authenticated telephone call (e.g., not requiring additional authentication of the user to the IVR system) at step 412.

If, at step 410, the OTP is not validated, the computing platform 110 may cause the telephone call to be connected as a standard call at step 414. In some examples, the standard call may include the IVR system 120 requesting authentication information from the user prior to providing substantive interaction with the user.

Figure 5:
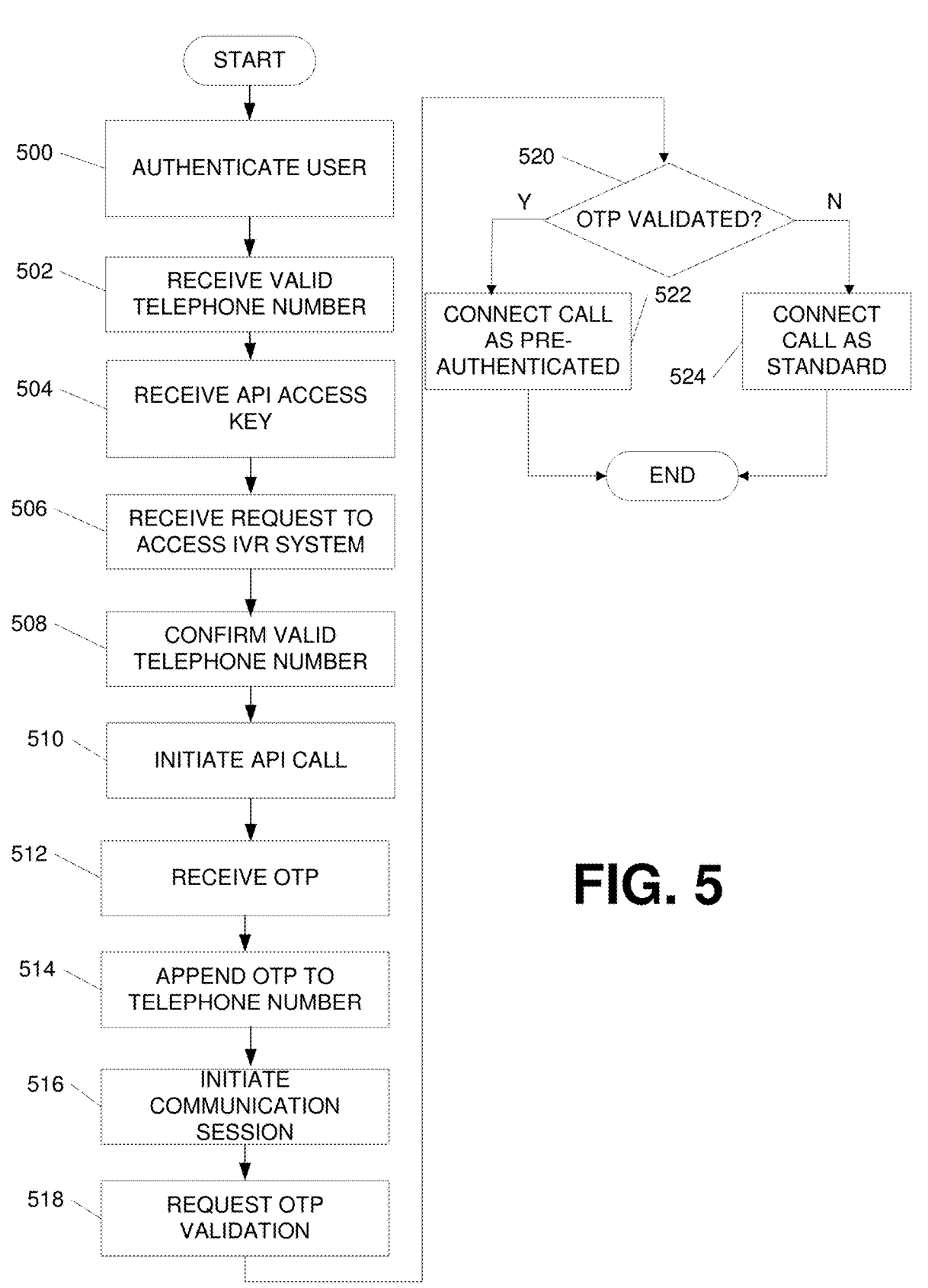
FIG. 5 illustrates an illustrative method for pre-authenticating users to an interactive voice response system in accordance with one or more aspects described herein.

FIG. 5 is a flow chart illustrating another example method of implementing pre-authentication at interactive voice response systems in accordance with one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 5 may be performed in real-time or near real-time.

At step 500, a computing device (e.g., remote user computing device 150, OTP generation and processing computing platform 110, or the like) may authenticate a user. For instance, authentication data (e.g., biometric data such as facial scan, fingerprint scan, or the like, username and password, personal identification number, or the like) may be captured and compared to pre-stored data to authenticate the user. In some examples, a cryptographic hash of the authentication data may be generated.

At step 502, at least one valid telephone number associated with an enterprise organization IVR system may be received. In some examples, the at least one valid telephone number may be received from the enterprise organization (e.g., during a registration process to register for pre-authentication). In some examples, the at least one valid telephone number may be received via an application associated with the enterprise organization and executing on the computing device. In some arrangements, valid telephone numbers associated with a plurality of different enterprise organizations may be received.

At step 504, the computing device may receive an enterprise organization application programming interface (API) access key. The at least one valid telephone number and enterprise organization API access key may be stored by the computing device (e.g., in a device table).

At step 506, the computing device may receive a request to access the enterprise organization IVR system. In some examples, the request to access the enterprise organization IVR system may include a telephone number (e.g., a telephone number input by a user).

At step 508, the received telephone number may be compared to the at least one valid telephone number associated with the enterprise organization IVR system to confirm that the telephone number matches the at least one valid telephone number associated with the IVR system. If the numbers do not match, the process may end.

Based on confirming that the telephone number matches the at least one valid telephone number associated with the enterprise organization IVR system, at step 510, the computing device may initiate an application programming interface (API) call to the enterprise organization (e.g., OTP generation and processing computing platform 110). In some examples, initiating the API call may include transmitting the authentication data of the user (e.g., the cryptographic hash of the authentication data) and the enterprise organization API access key.

At step 512, the computing device may receive, from the enterprise organization and via the API call, a one-time passcode. The one-time passcode may be unique to the user and the request to access the IVR system (and/or the initiated communication session).

At step 514, the computing device may append the OTP to the telephone number of the IVR system 120 as a suffix.

At step 516, the computing device may initiate a communication session with the enterprise organization IVR system 120 using the telephone number and OTP appended to the telephone number as a suffix.

At step 518, the computing device may request validation of the OTP from the enterprise organization IVR system. For instance, initiating the communication session may initiate a telephone call to the enterprise organization IVR system using the telephone number and OTP appended to the telephone number as a suffix. The IVR system 120 may receive the initiate telephone call and extract the OTP and validate the OTP (e.g., confirm whether the OTP received matches the OTP generated by the enterprise organization (e.g., OTP generation and processing computing platform 110).

At step 520, a determination may be made as to whether the OTP was validated. If so, the telephone call to be connected as a pre-authenticated telephone call (e.g., not requiring additional authentication of the user to the IVR system) at step 522.

If, at step 520, the OTP is not validated, the telephone call to be connected as a standard call at step 524. In some examples, the standard call may include the IVR system 120 requesting authentication information from the user prior to providing substantive interaction with the user.

As discussed herein, aspects described provide secure pre-authentication for users access an interactive voice response (IVR) system of an enterprise organization. For instance, as discussed herein, a user may initiate a communication session with the IVR system through a mobile application of the enterprise organization executing on a mobile device of the user. The call may be intercepted and a confirmation that the user is logged in to the application may be generated. A one-time passcode may be generated and appended to the telephone number used to initiate the communication session as a suffix. The call may then be completed (e.g., the mobile device of the user may be connected to the IVR system) and the IVR system may extract the one-time passcode from the number. The one-time passcode may be validated and, if validated, the user may be pre-authenticated to the call (e.g., the user may be considered authenticated and no additional authentication data may be requested by the IVR system from the user). If the one-time passcode is not validated, the call may proceed as a standard call (e.g., the user device may be connected to the IVR system and the IVR system may request authentication data from the user prior to proceeding with substantive portion of the call).

In another example, a user may initiate a communication session with the IVR system through the operating system of the user computing device. In some examples, the user may have already registered with the system and valid telephone numbers for the IVR system, as well as an API access key for the enterprise organization may be stored by the user computing device. The user computing device may confirm that the telephone number used to initiate the communication session matches a valid telephone number and, if so, may initiate an API call to the enterprise organization. The call may include the API access key for the enterprise organization. The user computing device may receive a one-time passcode (e.g., via the API call) that may be appended to the telephone number and the call may be connected to the IVR system. The IVR system may extract the one-time passcode from the number. The one-time passcode may be validated and, if validated, the user may be pre-authenticated to the call (e.g., the user may be considered authenticated and no additional authentication data may be requested by the IVR system from the user). If the one-time passcode is not validated, the call may proceed as a standard call (e.g., the user device may be connected to the IVR system and the IVR system may request authentication data from the user prior to proceeding with substantive portion of the call).

Figure 6:
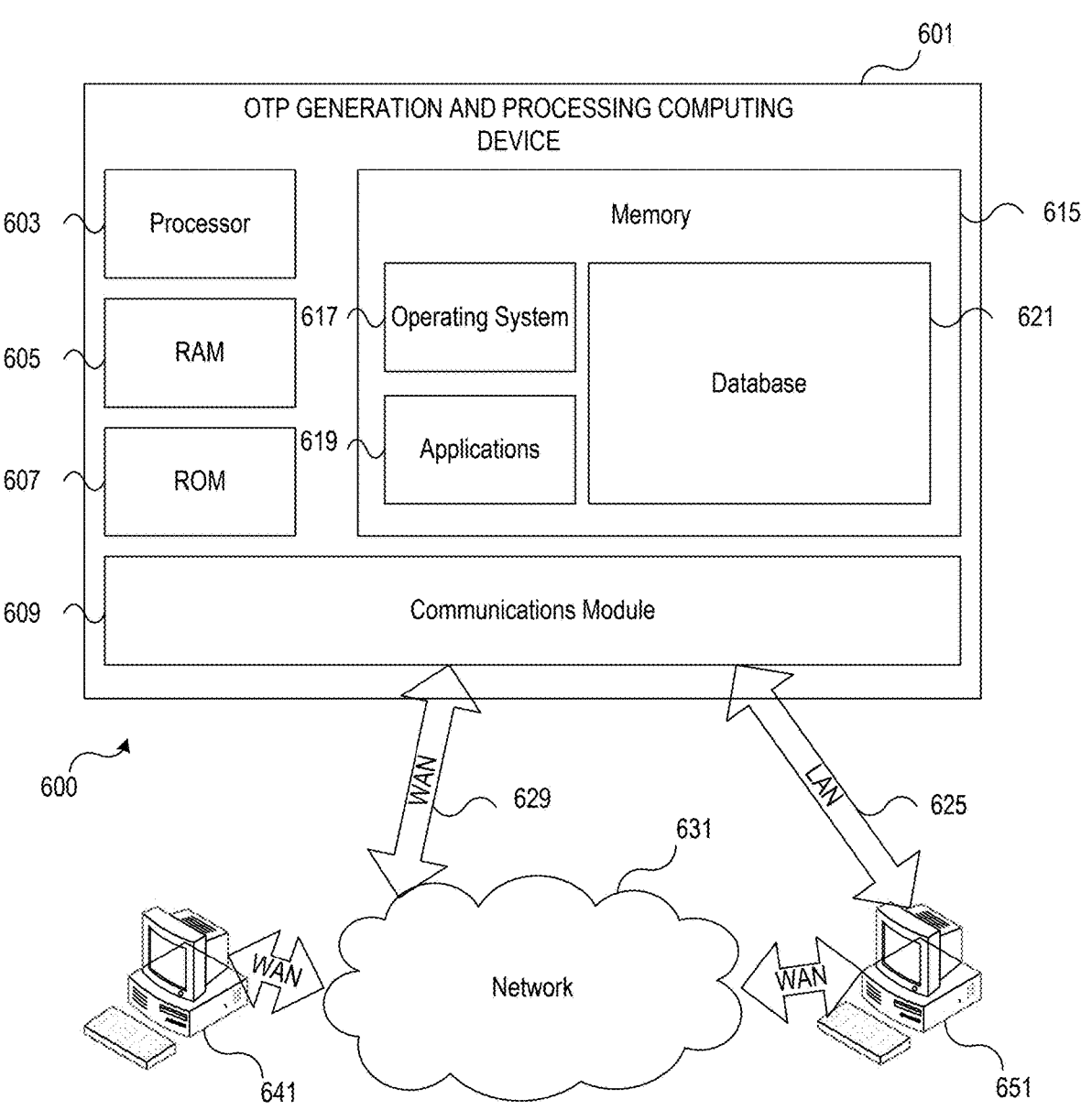
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include OTP generation and processing computing device 601 having processor 603 for controlling overall operation of OTP generation and processing computing device 601 and its associated components, including Random Access Memory (RAM) 605, Read-Only Memory (ROM) 607, communications module 609, and memory 615. OTP generation and processing computing device 601 may include a variety of computer readable media. Computer readable media may be any available media that may be accessed by OTP generation and processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by OTP generation and processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on OTP generation and processing computing device 601. Such a processor may execute computer-executable instructions stored on a computer-readable medium.

Software may be stored within memory 615 and/or storage to provide instructions to processor 603 for enabling OTP generation and processing computing device 601 to perform various functions as discussed herein. For example, memory 615 may store software used by OTP generation and processing computing device 601, such as operating system 617, application programs 619, and associated database 621. Also, some or all of the computer executable instructions for OTP generation and processing computing device 601 may be embodied in hardware or firmware. Although not shown, RAM 605 may include one or more applications representing the application data stored in RAM 605 while OTP generation and processing computing device 601 is on and corresponding software applications (e.g., software tasks) are running on OTP generation and processing computing device 601.

Communications module 609 may include a microphone, keypad, touch screen, and/or stylus through which a user of OTP generation and processing computing device 601 may provide input, and may also include one or more of a speaker for providing audio output and a video display device for providing textual, audiovisual and/or graphical output. Computing system environment 600 may also include optical scanners (not shown).

OTP generation and processing computing device 601 may operate in a networked environment supporting connections to one or more remote computing devices, such as computing devices 641 and 651. Computing devices 641 and 651 may be personal computing devices or servers that include any or all of the elements described above relative to OTP generation and processing computing device 601.

The network connections depicted in FIG. 6 may include Local Area Network (LAN) 625 and Wide Area Network (WAN) 629, as well as other networks. When used in a LAN networking environment, OTP generation and processing computing device 601 may be connected to LAN 625 through a network interface or adapter in communications module 609. When used in a WAN networking environment, OTP generation and processing computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing device, comprising:
at least one processor;
a communication interface communicatively coupled to the at least one processor; and
a memory storing computer-readable instructions that, when executed by the at least one processor, cause the computing device to:
authenticate a user to the computing device;
receive at least one valid telephone number associated with an enterprise organization interactive voice response (IVR) system;
receive, from an enterprise organization associated with the enterprise organization IVR system, an enterprise organization application programming interface (API) access key;
store the valid telephone number associated with the enterprise organization IVR system and the enterprise organization API access key;
receive a request to access the enterprise organization IVR system, wherein the request include a telephone number;
compare the telephone number to the telephone number associated with the enterprise organization IVR system to confirm the telephone number matches the at least one valid telephone number associated with the enterprise organization IVR system;
based on confirming that the telephone number matches the at least one valid telephone number associated with the enterprise organization IVR system, initiate an application programming interface (API) call to the enterprise organization, wherein initiating the API call to the enterprise organization includes transmitting user authentication data and the enterprise organization API access key;
receive, from the enterprise organization and via the API call, a one-time passcode;
append the one-time passcode to the telephone number as a suffix;
initiate a communication session with the enterprise organization IVR system using the telephone number and the one-time passcode appended to the telephone number as a suffix, wherein initiating the communication session with the enterprise organization IVR system includes:
initiating a telephone call to the enterprise organization IVR system;
requesting validation, by the enterprise organization IVR system, of the one-time passcode appended to the telephone number as a suffix;

responsive to the enterprise organization IVR system validating the one-time passcode appended to the telephone number as a suffix, connecting the telephone call as a pre-authenticated telephone call; and responsive to the enterprise organization IVR system not validating the one-time passcode appended to the telephone number as a suffix, connecting the telephone call as a standard telephone call requiring authentication.

2. The computing device of claim 1, wherein authenticating the user to the computing device includes receiving biometric data of the user and generating a cryptographic hash of the biometric data.

3. The computing device of claim 2, wherein transmitting the user authentication data includes transmitting the cryptographic hash.

4. The computing device of claim 1, wherein the one-time passcode is unique to the user and the initiated communication session.

5. The computing device of claim 1, further including instructions that, when executed, cause the computing device to:

send a request for registration to the enterprise organization.

6. The computing device of claim 5, wherein sending the request for registration to the enterprise organization includes sending the request via an application associated with the enterprise organization and executing on the computing device.

7. The computing device of claim 1, wherein the at least one valid telephone number and the enterprise organization API access key are stored in a device table.

8. The computing device of claim 1, wherein the standard telephone call requiring authentication includes prompts generated by the enterprise organization IVR system requesting authentication information from the user.

9. A method, comprising:

authenticating, by a computing device, the computing device having at least one processor, and memory, a user to the computing device;

receiving, by the at least one processor, at least one valid telephone number associated with an enterprise organization interactive voice response (IVR) system;

receiving, by the at least one processor and from an enterprise organization associated with the enterprise organization IVR system, an enterprise organization application programming interface (API) access key;

storing, by the at least one processor, the valid telephone number associated with the enterprise organization IVR system and the enterprise organization API access key;

receiving, by the at least one processor, a request to access the enterprise organization IVR system, wherein the request include a telephone number;

comparing, by the at least one processor, the telephone number to the telephone number associated with the enterprise organization IVR system to confirm the telephone number matches the at least one valid telephone number associated with the enterprise organization IVR system;

based on confirming that the telephone number matches the at least one valid telephone number associated with the enterprise organization IVR system, initiating, by the at least one processor, an application programming interface (API) call to the enterprise organization, wherein initiating the API call to the enterprise organization includes transmitting user authentication data and the enterprise organization API access key;

receiving, by the at least one processor and from the enterprise organization and via the API call, a one-time passcode;

appending, by the at least one processor, the one-time passcode to the telephone number as a suffix;

initiating, by the at least one processor, a communication session with the enterprise organization IVR system using the telephone number and the one-time passcode appended to the telephone number as a suffix, wherein initiating the communication session with the enterprise organization IVR system includes:

initiating a telephone call to the enterprise organization IVR system;

requesting validation, by the enterprise organization IVR system, of the one-time passcode appended to the telephone number as a suffix;

responsive to the enterprise organization IVR system validating the one-time passcode appended to the telephone number as a suffix, connecting the telephone call as a pre-authenticated telephone call; and responsive to the enterprise organization IVR system not validating the one-time passcode appended to the telephone number as a suffix, connecting the telephone call as a standard telephone call requiring authentication.

10. The method of claim 9, wherein authenticating the user to the computing device includes receiving biometric data of the user and generating a cryptographic hash of the biometric data.

11. The method of claim 10, wherein transmitting the user authentication data includes transmitting the cryptographic hash.

12. The method of claim 9, wherein the one-time passcode is unique to the user and the initiated communication session.

13. The method of claim 9, further including:

sending, by the at least one processor, a request for registration to the enterprise organization.

14. The method of claim 13, wherein sending the request for registration to the enterprise organization includes sending the request via an application associated with the enterprise organization and executing on the computing device.

15. The method of claim 9, wherein the at least one valid telephone number and the enterprise organization API access key are stored in a device table.

16. The method of claim 9, wherein the standard telephone call requiring authentication includes prompts generated by the enterprise organization IVR system requesting authentication information from the user.

17. One or more non-transitory computer-readable media storing instructions that, when executed by a computing device comprising at least one processor, memory, and a communication interface, cause the computing device to:

authenticate a user to the computing device;

receive at least one valid telephone number associated with an enterprise organization interactive voice response (IVR) system;

receive, from an enterprise organization associated with the enterprise organization IVR system, an enterprise organization application programming interface (API) access key;

store the valid telephone number associated with the enterprise organization IVR system and the enterprise organization API access key;

receive a request to access the enterprise organization IVR system, wherein the request include a telephone number;

compare the telephone number to the telephone number associated with the enterprise organization IVR system to confirm the telephone number matches the at least one valid telephone number associated with the enterprise organization IVR system;

based on confirming that the telephone number matches the at least one valid telephone number associated with the enterprise organization IVR system, initiate an application programming interface (API) call to the enterprise organization, wherein initiating the API call to the enterprise organization includes transmitting user authentication data and the enterprise organization API access key;

receive, from the enterprise organization and via the API call, a one-time passcode;

append the one-time passcode to the telephone number as a suffix;

initiate a communication session with the enterprise organization IVR system using the telephone number and the one-time passcode appended to the telephone number as a suffix, wherein initiating the communication session with the enterprise organization IVR system includes:

initiating a telephone call to the enterprise organization IVR system;

requesting validation, by the enterprise organization IVR system, of the one-time passcode appended to the telephone number as a suffix;

responsive to the enterprise organization IVR system validating the one-time passcode appended to the telephone number as a suffix, connecting the telephone call as a pre-authenticated telephone call; and responsive to the enterprise organization IVR system not validating the one-time passcode appended to the telephone number as a suffix, connecting the telephone call as a standard telephone call requiring authentication.

18. The one or more non-transitory computer-readable media of claim 17, wherein authenticating the user to the computing device includes receiving biometric data of the user and generating a cryptographic hash of the biometric data.

19. The one or more non-transitory computer-readable media of claim 18, wherein transmitting the user authentication data includes transmitting the cryptographic hash.

20. The one or more non-transitory computer-readable media of claim 17, wherein the one-time passcode is unique to the user and the initiated communication session.

* * * * *